United States Patent
Huang et al.

(10) Patent No.: US 10,763,668 B2
(45) Date of Patent: Sep. 1, 2020

(54) CONVERTER WITH INDUCTORS COUPLED IN SERIES

(71) Applicant: MediaTek Inc., Hsin-Chu (TW)

(72) Inventors: Hua-Chiang Huang, Hsinchu (TW); Chih-Chen Li, Hsinchu (TW)

(73) Assignee: MediaTek Inc., Hsin-Chu (TW)

( * ) Notice: Subject to any disclaimer, the term of this patent is extended or adjusted under 35 U.S.C. 154(b) by 0 days.

(21) Appl. No.: 16/103,683

(22) Filed: Aug. 14, 2018

(65) Prior Publication Data

US 2019/0131789 A1    May 2, 2019

Related U.S. Application Data (60) Provisional application No. 62/579,941, filed on Nov. 1, 2017.

(51) Int. Cl.
| | | |
|---|---|---|
| *H02J 1/10* | (2006.01) | |
| *H02M 3/158* | (2006.01) | |
| *H02M 3/156* | (2006.01) | |
| *H02J 3/34* | (2006.01) | |

(52) U.S. Cl.
CPC .............. *H02J 1/102* (2013.01); *H02J 3/34* (2013.01); *H02M 3/1584* (2013.01); *H02M 2003/1566* (2013.01); *H02M 2003/1586* (2013.01)

(58) Field of Classification Search
CPC ........ H02J 1/102; H02J 2001/104; H02J 3/34; H02M 3/1584; H02M 3/158; H02M 1/14; H02M 1/08; H02M 2001/007; H02M 2001/0074; H02M 2001/0077; H02M 2001/0019; H02M 2001/1564
See application file for complete search history.

(56) References Cited

U.S. PATENT DOCUMENTS

| | | | | |
|---|---|---|---|---|
| 5,663,874 A | * | 9/1997 | Mader | H02M 3/33507 363/131 |
| 6,995,548 B2 | * | 2/2006 | Walters | H02M 3/1584 323/272 |
| 9,231,468 B2 | * | 1/2016 | Ura | H02M 1/4225 |
| 10,135,334 B1 | * | 11/2018 | Vinciarelli | H02M 3/1582 |
| 2005/0179324 A1 | * | 8/2005 | Petricek | H02J 1/10 307/44 |
| 2009/0174262 A1 | * | 7/2009 | Martin | H02M 3/157 307/82 |
| 2011/0063878 A1 | * | 3/2011 | Petricek | H02M 3/1584 363/21.12 |

(Continued)

FOREIGN PATENT DOCUMENTS

| | | |
|---|---|---|
| CN | 104143909 A | 11/2014 |
| EP | 744817 B1 | 10/2001 |

(Continued)

*Primary Examiner* — Gustavo A Rosario-Benitez
(74) *Attorney, Agent, or Firm* — Wolf, Greenfield & Sacks, P.C.

(57) ABSTRACT

A converter is provided. The converter is capable of generating a loading current at an output node. The converter includes a high efficiency power channel and a fast transient response channel. The high efficiency power channel and the fast transient response channel share an inductor that is coupled to the output node. The high efficiency power channel has an additional inductor that is connected in series with the inductor coupled to the output node.

19 Claims, 11 Drawing Sheets

(56) References Cited

U.S. PATENT DOCUMENTS

| | | | | |
|---|---|---|---|---|
| 2013/0093403 | A1* | 4/2013 | Jia | H02M 3/1588 |
| | | | | 323/272 |
| 2013/0235631 | A1* | 9/2013 | Pahlevaninezhad | |
| | | | | H02M 3/1584 |
| | | | | 363/126 |
| 2014/0117951 | A1* | 5/2014 | Dally | H02M 3/158 |
| | | | | 323/266 |
| 2015/0022167 | A1* | 1/2015 | LoCascio | H02M 3/158 |
| | | | | 323/282 |
| 2016/0036330 | A1* | 2/2016 | Sturcken | H02M 3/1584 |
| | | | | 323/271 |
| 2016/0301310 | A1* | 10/2016 | Mednik | H02M 1/34 |
| 2017/0005563 | A1* | 1/2017 | Ayyanar | H02M 1/088 |
| 2017/0126146 | A1* | 5/2017 | Petersen | H02M 3/156 |
| 2017/0133947 | A1 | 5/2017 | Fu et al. | |
| 2017/0302177 | A1* | 10/2017 | LaBella | H02M 1/08 |
| 2017/0373592 | A1* | 12/2017 | Takahashi | H02M 3/156 |
| 2018/0254706 | A1* | 9/2018 | Cheng | H02M 3/1584 |
| 2018/0294732 | A1* | 10/2018 | Ye | H02M 3/33546 |
| 2019/0089252 | A1* | 3/2019 | Li | H02M 3/158 |

FOREIGN PATENT DOCUMENTS

| | | |
|---|---|---|
| TW | 1286876 B | 9/2007 |
| TW | 200818686 A | 4/2008 |
| WO | WO 2013/114644 A1 | 8/2013 |

\* cited by examiner

CONVERTER WITH INDUCTORS COUPLED IN SERIES

CROSS REFERENCE TO RELATED APPLICATIONS

This application claims priority to and the benefit of U.S. Provisional Patent Application Ser. No. 62/579,941, filed on Nov. 1, 2017 and entitled "Converter with Inductors in Series," which is hereby incorporated herein by reference in its entirety.

TECHNICAL FIELD

The present disclosure relates to converters, and in particular to converters with high efficiency and fast transient performance.

BACKGROUND

A converter converts one voltage level (e.g., an input voltage Vin) to another voltage level (e.g., an output voltage Vout). A converter includes one or more inductors coupled to an output node of the converter. A converting efficiency is determined by a ratio of an output power to a total power including the output power and power losses, e.g., conduction loss, switching loss and driving loss.

SUMMARY

Power converters with high efficiency and fast transient performance are provided.

Some embodiments relate to a converter for generating a loading current at an output node. The converter comprises a plurality of inductors and a plurality of power channels. The plurality of inductors comprise a first inductor coupled to the output node. The plurality of power channels comprise first and second power channels. The first power channel comprises the first inductor. The second power channel comprises the first inductor. The first power channel has higher power efficiency than the second power channel.

In some embodiments, the second power channel has a faster transient response than the first power channel.

In some embodiments, the first power channel comprises a second inductor that is connected in series with the first inductor.

In some embodiments, the plurality of power channels comprise a third power channel. The plurality of inductors comprise a third inductor coupled to the output node. The third power channel comprises the third inductor.

In some embodiments, the first power channel has higher power efficiency than the third power channel.

In some embodiments, the converter further comprises a plurality of drive circuits to drive the plurality of power channels; and a control loop circuit to control the plurality of drive circuits.

In some embodiments, the first and second power channels are driven with signals of 180 degree phase differences.

In some embodiments, the first power channel is enabled. The second power channel is enabled when a transient event occurs. The second power channel is synchronized with the first power channel when the second power channel is enabled.

In some embodiments, the first power channel operates most of the time for a first loading condition. The second power channel operates most of the time for a second loading condition. The second loading condition is heavier than the first loading condition.

In some embodiments, for the first loading condition, the second power channel is off, or enabled for a short time.

In some embodiments, for the second loading condition, the first power channel is off, or enabled for a short time.

Some embodiments relate to a converter for generating a loading current at an output node. The converter comprises a first inductor, a first power channel, and a second power channel. The first inductor is coupled to the output node, and has an inductance value. The first power channel comprises the first inductor and a second inductor connected in series with the first inductor. The second inductor has an inductance value. The second power channel also comprises the first inductor.

In some embodiments, the converter further comprises a first drive circuit to drive the first power channel, a second drive circuit to drive the second power channel, and a control loop circuit to control the first and second drive circuits based on an output voltage at the output node and a reference voltage.

In some embodiments, the control loop circuit is configured to determine a loading condition at the output node, and/or an occurrence of a transient event at the output node.

In some embodiments, a ratio of the inductance value of the second inductor to the inductance value of the first inductor is greater than 2 and less than 8.

In some embodiments, the first and second power channels are driven with signals of 180 degree phase differences.

In some embodiments, the first power channel is enabled. The second power channel is enabled when a transient event occurs. The second power channel is synchronized with the first power channel when the second power channel is enabled.

In some embodiments, the first power channel operates most of the time for a first loading condition. The second power channel operates most of the time for a second loading condition. The second loading condition is heavier than the first loading condition.

In some embodiments, for the first loading condition, the second power channel is off, or enabled for a short time. For the second loading condition, the first power channel is off, or enabled for a short time.

Some embodiments relate to a method for a converter configured to generate a loading current at an output node of the converter. The method comprises measuring a loading condition of the converter; determining whether the loading condition is larger than a threshold value; and operating a first power channel or a second power channel based on the determined loading condition. The first power channel has higher power efficiency than the second power channel.

The foregoing summary is provided by way of illustration and is not intended to be limiting.

BRIEF DESCRIPTION OF DRAWINGS

In the drawings, each identical or nearly identical component that is illustrated in various figures is represented by a like numeral. For purposes of clarity, not every component may be labeled in every drawing. The accompanying drawings are not necessarily drawn to scale, with emphasis instead being placed on illustrating various aspects of the techniques and devices described herein.

DETAILED DESCRIPTION

The inventors have recognized and appreciated a tradeoff for converters between high power efficiency and fast transient response. A conventional converter provide currents to a load through a single power channel via a single inductor. A larger inductance provides higher efficiency, whereas a smaller inductance provides faster transient response. Conventionally, the inductance value is selected to balance a converter's power efficiency performance and transient response performance.

The inventors have also recognized and appreciated that different inductance values are better under different loading conditions. One factor of the power loss of the converter is the resistance values of the inductor, which has two types of resistance values: an AC resistance (ACR) value and a DC resistance (DCR) value. Both of the resistance values influence the efficiency of the converter. When the loading of the converter is small (that is, the loading current is small), the power loss induced by the ACR value of the inductor dominates the power loss of the converter. In this case, it is desired for the inductor to have a large inductance value to decrease the ripple on the inductor current flowing through the inductor, thereby getting higher efficiency for the converter. On the other hand, when the loading of the converter is large (that is, the loading current is large), the power loss induced by the DCR value of the inductor dominates the power loss. At this time, it is desired for the inductor to have a small inductance value to decrease the average value of the inductor current flowing through the inductors, thereby getting higher efficiency for the converter.

The inventors have recognized and appreciated that a converter can have both high efficiency and fast transient response by having at least two power channels, which may have different power conversion efficiencies and responses times. In some embodiments, a converter may have first and second power channels, both of which include a first inductor that is coupled to an output node. The first power channel may have higher power conversion efficiency than the second power channel, and thus may be referred to as an efficient power channel. The efficient power channel may include a second inductor that is connected in series with the first inductor. The second power channel may have faster transient response than the first power channel, and thus may be referred to as a fast power channel. The fast power channel may share at least the first inductor with the efficient power channel. In some embodiments, the fast power channel may include no inductors other than the first inductor.

Figure 1:
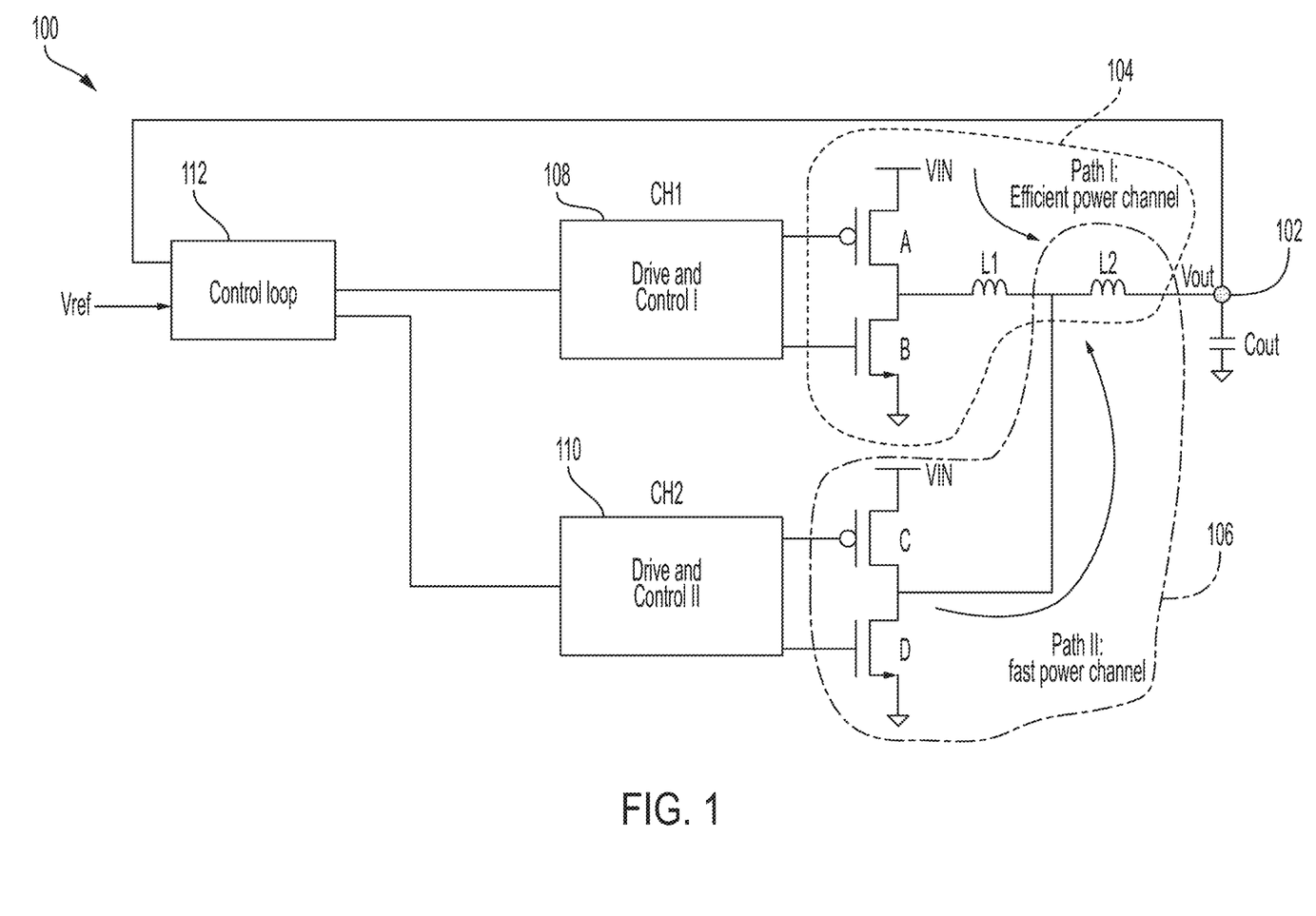
FIG. 1 is a schematic diagram illustrating a converter, according to some embodiments.

FIG. 1 depicts a converter 100, according to some embodiments. The converter 100 may convert an input voltage VIN to an output voltage Vout at an output node 102 to drive a load, which may be coupled to the output node 102. The value of the load may change depending on, for example, an operation mode of a system driven by the output voltage Vout. For example, the output voltage Vout may drive a smartphone, which may operate in an active mode corresponding to a heavy loading condition, or a standby mode corresponding to a light loading condition.

The converter 100 may include a first power channel 104 and a second power channel 106. The first power channel may include transistors A, B, a first inductor L1, and a second inductor L2 in series with the first inductor L1. The second inductor L2 may be coupled to the output node 102. The first inductor L1 may be coupled to the second inductor L2, such that it is coupled to the output node 102 via the second inductor L2. The second power channel may include transistors C, D and the second inductor L2. The transistors C, D may be configured similar to transistors A, B, for example, having the same gate lengths and widths.

The first and second inductors L1, L2 may be implemented by any suitable way, for example, to accommodate available footprint of an integrated circuit (IC). In some embodiments, inductors L1, L2 may be formed as discrete components. In some embodiments, L1, L2 may be integrated inductors, such as on-chip spiral inductors. In some embodiments, inductors L1, L2 may each be a portion of a single inductor.

In some embodiments, L1 may have a larger inductance than L2. In some embodiments, a ratio of the L1's inductance to L2's inductance may be greater than 1 and less than 10, such as greater than 2 and less than 8, including, for example, greater than 3 and less than 5, such as 4, for example. However, this is by way of illustration, as in some embodiments the ratio of inductances may be in a different range.

The first power channel 104 may have higher efficiency than the second power channel, and may be referred to as an efficient power channel. The second power channel 106 may have faster transient response than the first power channel, and may be referred to as a fast power channel.

The converter 100 may include a first drive and control circuit 108, a second drive and control circuit 110, and a control loop circuit 112 to control the first and second drive and control circuits 108, 110. The first and second drive and control circuits 108, 110 may drive and control the first and second power channels 104, 106, respectively. In some embodiments, drive and control circuits 108, 110 may be one drive and control circuit that is shared by both the first and second power channels 104, 106.

In some embodiments, the first drive and control circuit 108 may include a drive circuit to drive the first power channel 104. The first drive and control circuit 108 may also include a control circuit that may be programmed with instructions to control the first power channel 104 to, for example, switch between the input voltage VIN and a low voltage (e.g., ground) at a first switching frequency.

Figure 5:
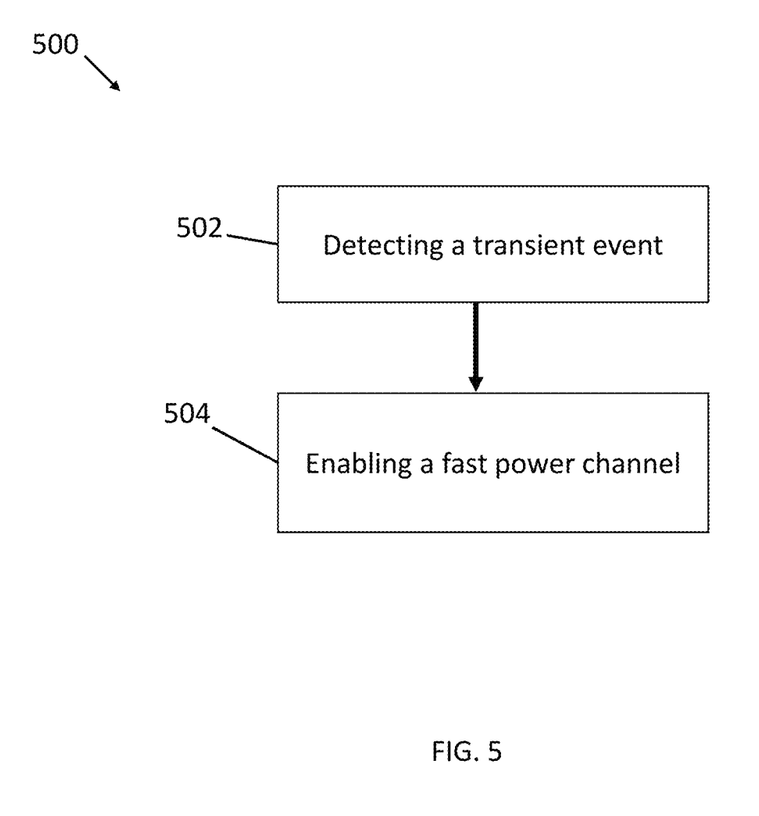
FIG. 5 is a flow chart illustrating a method of driving and controlling the converter of FIG. 1, according to some embodiments.
Figure 8:
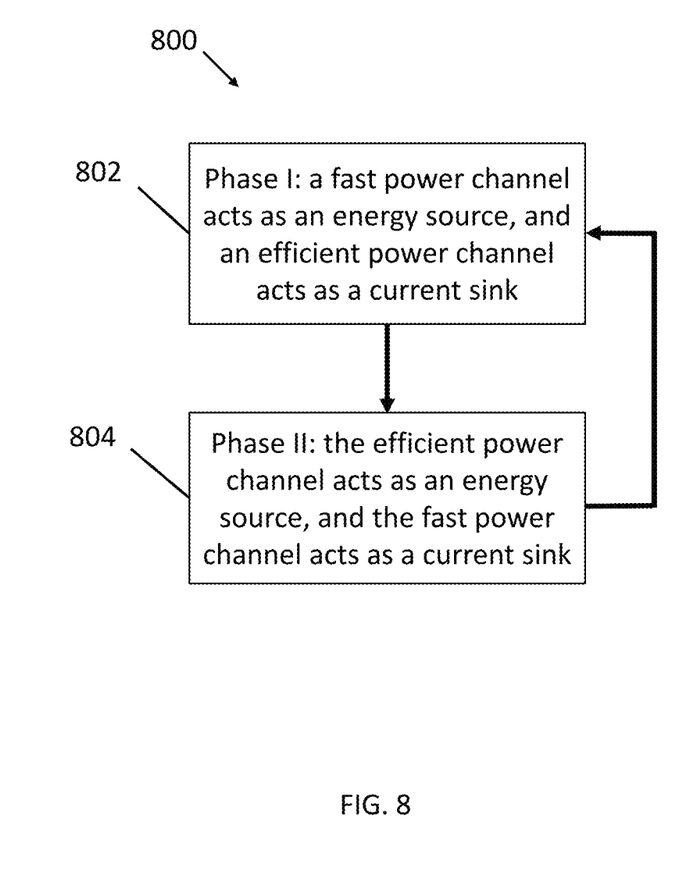
FIG. 8 is a flow chart illustrating a method of driving and controlling the converter of FIG. 1, according to some embodiments.

In some embodiments, the second drive and control circuit 110 may include a drive circuit to drive the second power channel 106. The second drive and control circuit 110 may also include a control circuit that may be programmed with instructions to control the second power channel 106 to, for example, switch between the input voltage VIN and a low voltage (e.g., ground) at a second switching frequency. In some embodiments, the second switching frequency may be less than the first switching frequency (e.g., method 500 as illustrated in FIG. 5). In some embodiments, the second switching frequency may be the same as the first switching frequency when the converter 100 operates in a steady state (e.g., method 800 as illustrated in FIG. 8).

The control loop circuit 112 may control the first and second drive and control circuits 108, 110 by, for example, comparing a feedback from the output node 102 (e.g., the output voltage Vout) to a reference (e.g., a reference voltage Vref). The comparison results may indicate a magnitude of a load driven by the converter 100 and/or a transient event by the output node 102. A transient event may occur when the requirement of a loading current at the output node 102 changes caused by, for example, a change of operation mode of a system driven by the converter 100. In some embodiments, the control loop circuit may be a control circuit or a processor programmed with instructions for controlling the first and second drive and control circuits 108, 110. In some embodiments, the first and second drive and control circuits 108, 110 may be drive circuits and have no control circuits. In these scenarios, the control loop circuit 112 may control drive circuits 108, 110 and thus control the first and second power channels 104, The converter 100 may function as a buck converter when either one of the first and second power channels is enabled. The converter 100 includes two power channels sharing an inductor L2 in the illustrated example, however, the present application should not be limited to two power channels sharing one inductor. A converter may include any suitable number of power channels sharing one or more inductors, for example, to accommodate requirements of power efficiency and transient response. For example, a converter may include three power channels sharing one inductor that is coupled to an output node of the converter.

Figure 2:
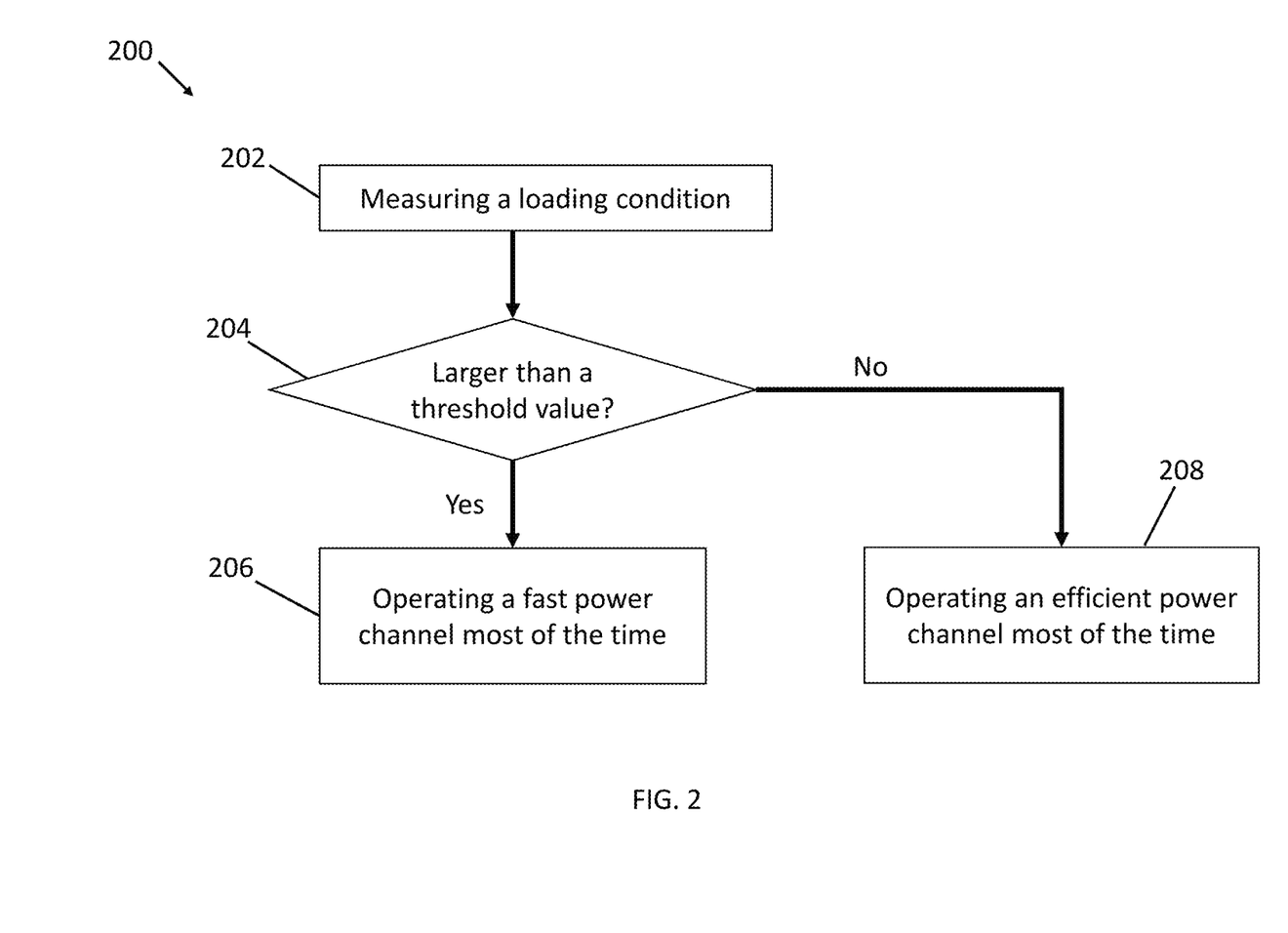
FIG. 2 is a flow chart illustrating a method of driving and controlling the converter of FIG. 1, according to some embodiments.

FIG. 2 is a flow chart illustrating a method 200 of driving and controlling the converter 100, according to some embodiments. The method 200 may start from measuring (act 202) a loading condition of the converter 100 is determined by, for example, the control loop circuit 112. The method may include determining (act 204) whether the loading condition is larger than a threshold value. If the loading condition is determined larger than the threshold value, the loading condition may be considered as a heavy loading condition. If the loading condition is determined smaller than the threshold value, the loading condition may be considered as a light loading condition. In some embodiments, the threshold value may be a threshold range, or an algorithm that is configured to determine the category of a loading condition.

The method 200 may further include, when the loading condition is determined as heavy, operating (act 206) a fast power channel (e.g., the second power channel 106) most of the time, for example, the probability of the fast power channel being in operation at a given time is greater than 50%, or greater than 70%, or greater than 90%, or any suitable percentage. The method 200 may include, when the loading condition is determined as light, operating (act 208) an efficient power channel (e.g., the first power channel 104) most of the time, for example, the probability of the efficient power channel being in operation at a given time is greater than 50%, greater than 70%, or greater than 90%, or any suitable percentage. During the heavy loading condition, although the fast power channel may operate most of the time, the efficient power channel may be turned off, or may be enabled for a short time, for example, less than 50% of the time that the fast power channel operates, less than 30%, less than 10%, or any suitable percentage. During the light loading condition, although the efficient power channel may operate most of the time, the fast power channel may be turned off, or may be enabled for a short time, for example, less than 50% of the time that the efficient power channel operates, less than 30%, less than 10%, or any suitable percentage.

Figure 3:
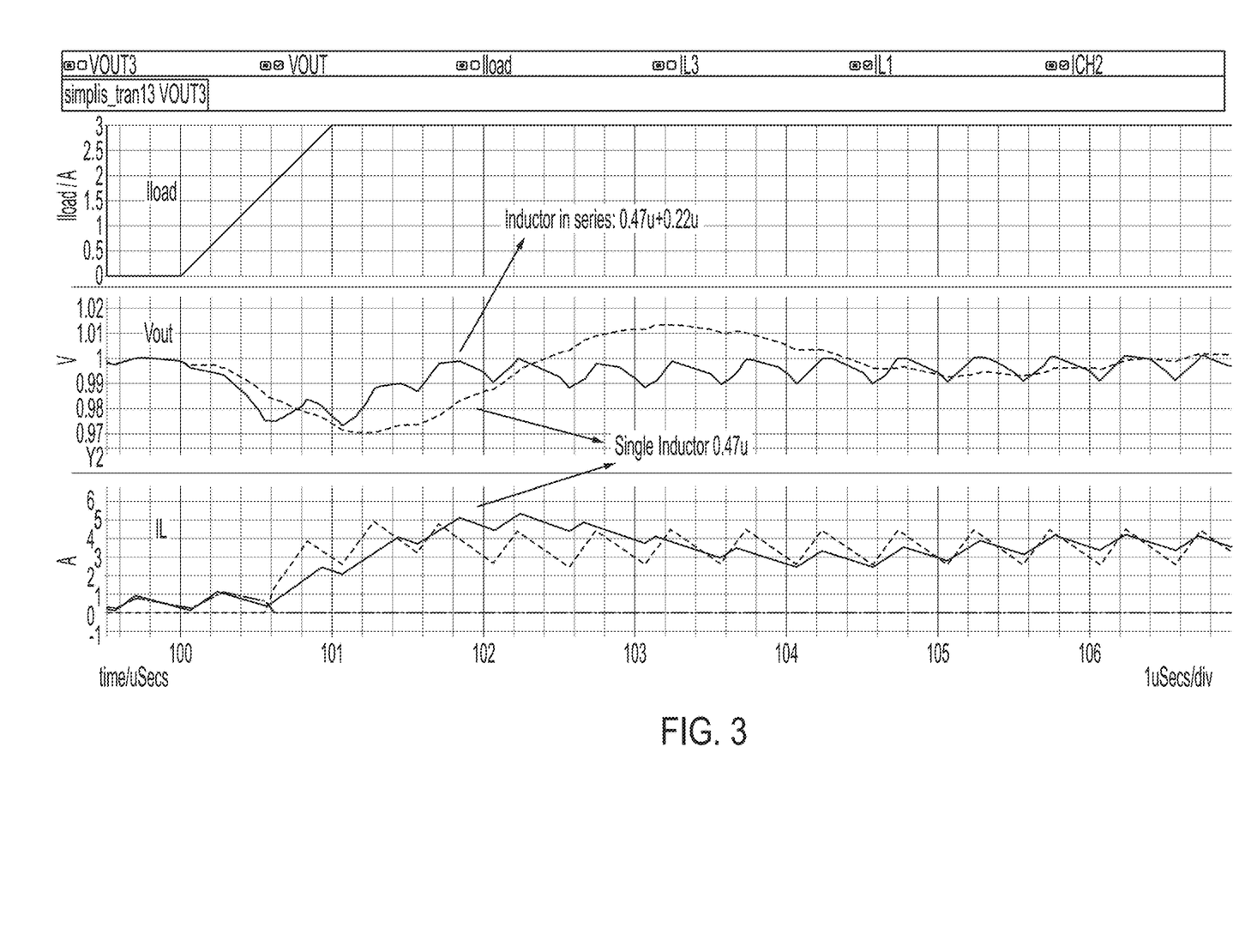
FIG. 3 is a timing diagram illustrating a comparison, between the converter of FIG. 1 and a conventional converter, of transient responses of an output voltage (Vout) and inductor current (IL) when a loading current (ILoad) with a slew rate of 3 A/μs is desired, according to some embodiments.

FIG. 3 is a timing diagram illustrating a comparison, between the converter 100 and a conventional converter, of transient responses of an output voltage (Vout) and inductor current (IL) when a loading current (ILoad) with a slew rate of 3 A/µs is desired, according to some embodiments. In the illustrated example, The conventional converter has only a single inductor of 0.47 µH, which is enabled all the time. On the other hand, the converter 100 has an L1 of 0.47 µH and an L2 of 0.22 µH. The converter 100 may be controlled by the method 200, which may measure the Iload to determine a loading condition of the converter 100. It may be determined that the loading condition is small before the increase of Iload. In this case, the efficient power channel may be enabled while the fast power channel may be disabled. When the Iload increases, it may be determined that the loading condition becomes large. At this time, the fast power channel, which has faster transient response than the efficient power channel, may be enable. As a result, the converter 100 reaches a desired Vout and IL faster than the conventional converter, and has less overshoot than the conventional converter.

Figure 4:
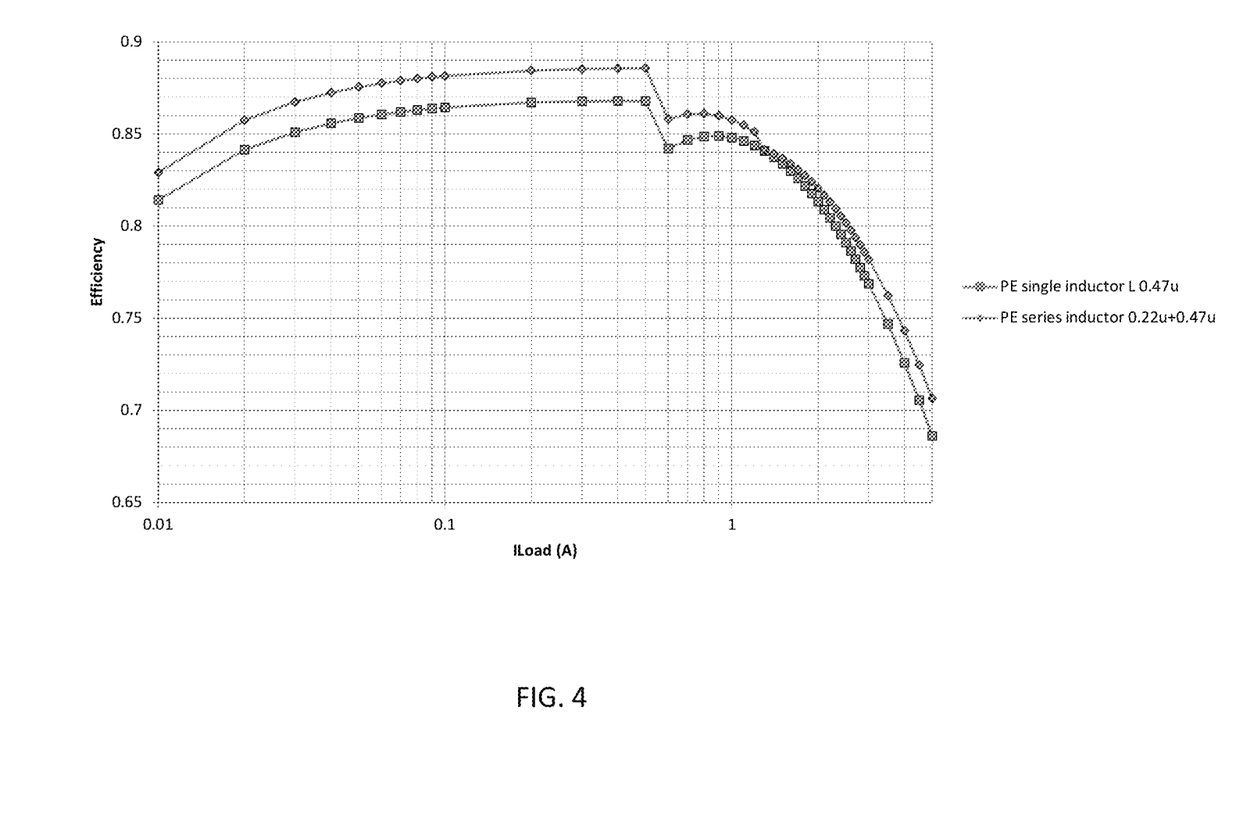
FIG. 4 is a schematic diagram illustrating a comparison, between the converter of FIG. 1 and a conventional converter, of efficiency curves depending on loading currents (ILoad), according to some embodiments.

FIG. 4 is a schematic diagram illustrating a comparison, between the converter 100 and a conventional converter, of efficiency curves depending on loading currents (ILoad), according to some embodiments. In the illustrated example, the converter 100 and the conventional converter is configured similar to the illustrated example of FIG. 3. FIG. 4 shows that the converter 100 improves the converting efficiency over the conventional converter by about 1.5% almost across the ILoad range of 0.01 A to 5 A.

In some embodiments, a converter may have a peak efficiency higher than 85%, higher than 88%, or higher than 92%. In some embodiments, a converter may have an AC transient response that is faster than –25 mV, faster than –20 mV, or faster than –15 mV.

FIG. 5 is a flow chart illustrating a method 500 of driving and controlling the converter 100, according to some embodiments. The method 500 may start from detecting (act 502) whether a transient event occurs by, for example, the control loop circuit 112. The method 500 may also include enabling (act 504) a fast power channel (e.g., the second power channel 106) to be synchronized with an efficient power channel that is already operating (e.g., the first power channel 104) when the occurrence of a transient event is detected.

Figure 6:
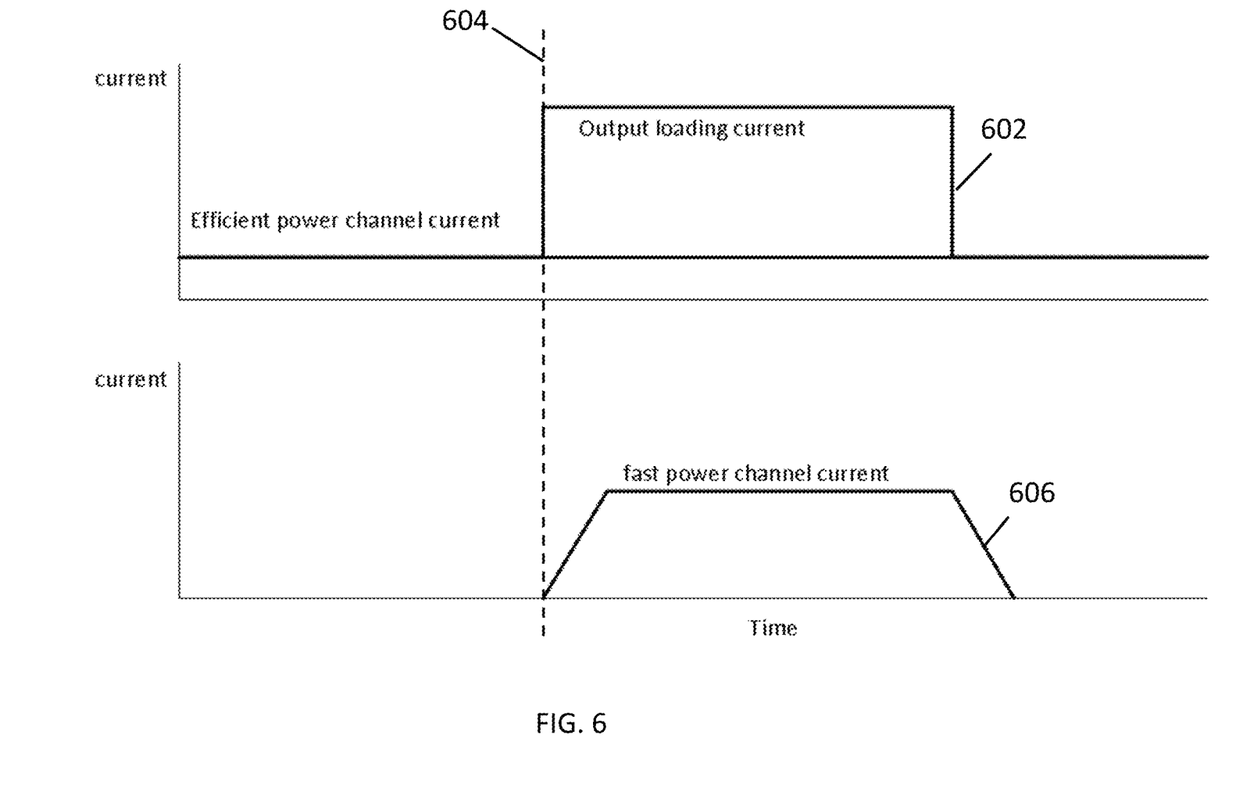
FIG. 6 is a timing diagram illustrating transient responses of the converter of FIG. 1, according to some embodiments.

FIG. 6 is a timing diagram illustrating transient responses of the converter 100 controlled by the method 500, according to some embodiments. Curve 602 illustrates an output loading current at the output node 102, which may include both the efficient power channel current (e.g., the current flowing through the first power channel 104) and fast power channel current (e.g., the current flowing through the second power channel 106). In the illustrated example, an efficient power channel is enabled before a detected transient event 604. Upon the detection of an transient event 604, a fast power channel is enabled to support the transient event. The current flowing through the fast power channel, as illustrated by curve 606, contributes to the overall output loading current illustrated by curve 602.

Figure 7:
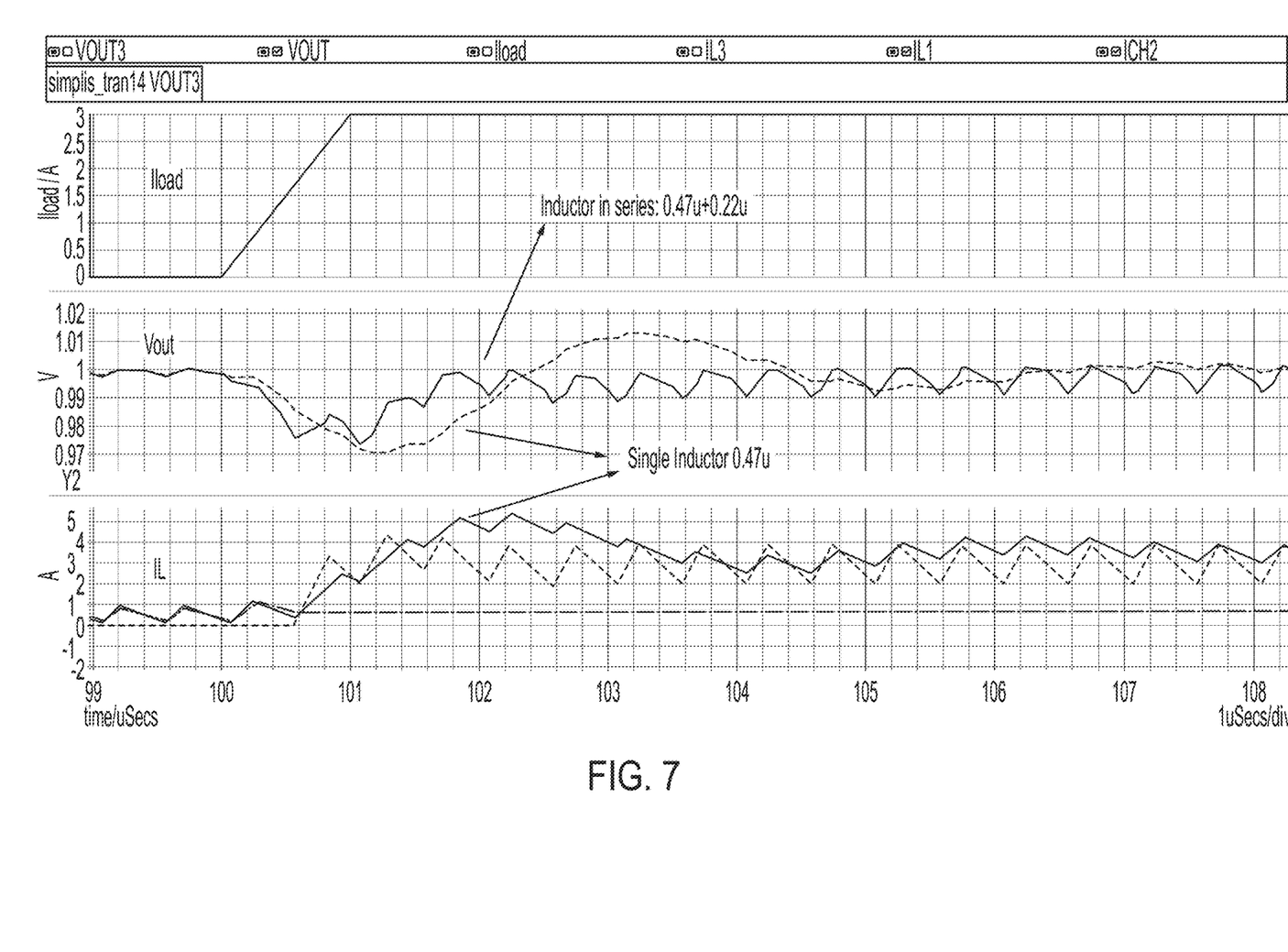
FIG. 7 is a timing diagram illustrating a comparison, between the converter of FIG. 1 and a conventional converter, of transient responses of an output voltage (Vout) and inductor current (IL) when a loading current (ILoad) with a slew rate of 3 A/μs is desired, according to some embodiments.

FIG. 7 is a timing diagram illustrating a comparison, between the converter 100 and a conventional converter, of transient responses of an output voltage (Vout) and inductor current (IL) when a loading current (ILoad) with a slew rate of 3 A/μs is desired, according to some embodiments. In the illustrated example, the converter 100 has an L1 of 0.47 μII and an L2 of 0.22 μH, and is controlled by the method 500. The conventional converter has only a single inductor of 0.47 μH. FIG. 7 shows that the converter reaches a desired Vout and IL faster than the conventional converter, and has less overshoot than the conventional converter.

FIG. 8 is a flow chart illustrating a method 800 of driving and controlling the converter 100, according to some embodiments. The method 800 may interleave an efficient power channel (e.g., the first power channel 104) and fast power channel (e.g., the second power channel 106) by, for example, driving the efficient power channel and fast power channel with signals of a 180 degree phase difference.

Figure 9A:
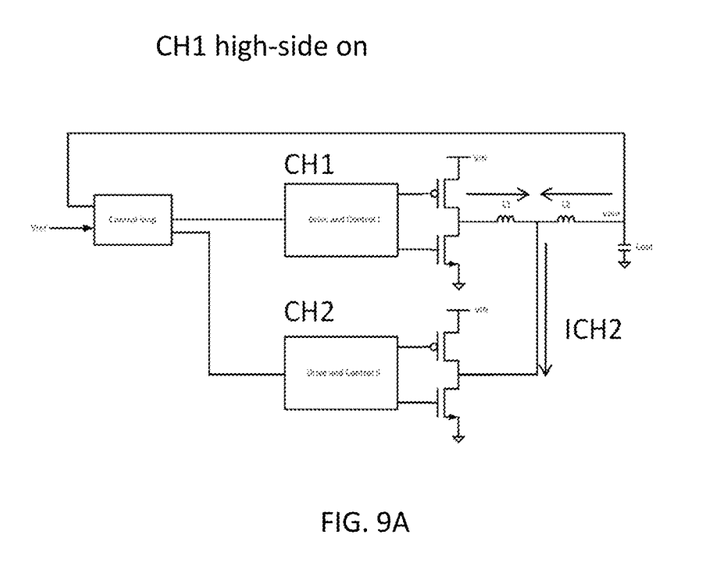
FIG. 9A is a schematic diagram illustrating the converter of FIG. 1 when an efficient power channel acts as an energy source, according to some embodiments.
Figure 9B:
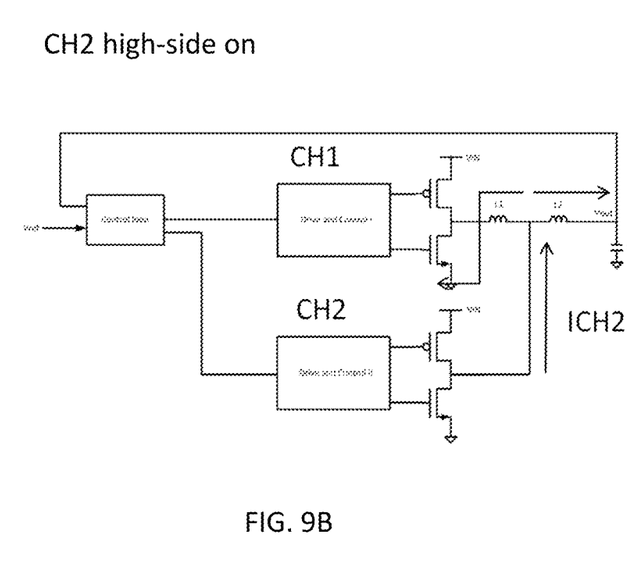
FIG. 9B is a schematic diagram illustrating the converter of FIG. 1 when a fast power channel acts as an energy source, according to some embodiments.

In some embodiments, the method 800 may include a Phase I (act 802) when a fast power channel acts as an energy source, and an efficient power channel acts as a current sink, as illustrated in FIG. 9B. The method 800 may also include a Phase II (act 804) when the efficient power channel acts as an energy source, and the fast power channel acts as a current sink, as illustrated in FIG. 9A.

The inventors have recognized and appreciated that the converter 100, controlled by the method 800, may have a higher efficiency than a conventional converter configured with a single power channel as the fast power channel of the converter 100. At the same time, the controverter 100, controlled by the method 800, may have a faster transient response than a conventional converter configured with a signal power channel as the efficiency power channel of the converter 100.

Figure 10:
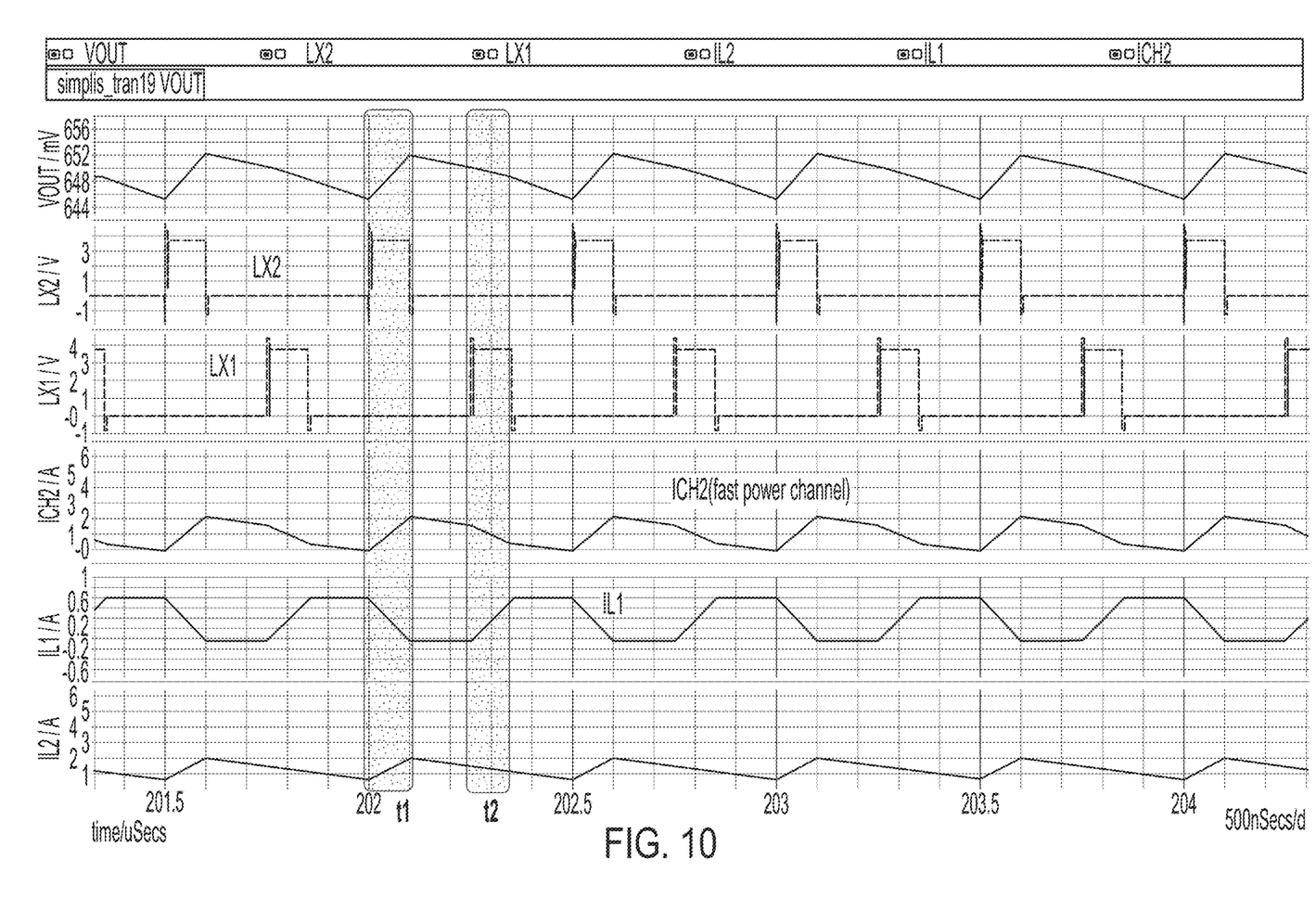
FIG. 10 a timing diagram illustrating an output voltage (Vout), inductor voltage across L1 (LX1), inductor voltage across L2 (LX2), inductor current through L1 (IL1), inductor current through L2 (IL2), and current through a fast power channel (ICH2) of the converter of FIG. 1, according to some embodiments.

FIG. 10 a timing diagram illustrating an output voltage (Vout), inductor voltage across L1 (LX1), inductor voltage across L2 (LX2), inductor current through L1 (IL1), inductor current through L2 (IL2), and current through a fast power channel (ICH2) of the converter 100, according to some embodiments. In the illustrated example, during t1, a fast power channel acts as an energy source, and an efficient power channel acts as a current sink. During t2, the efficient power channel acts as an energy source, and the fast power channel acts as a current sink.

Figure 11:
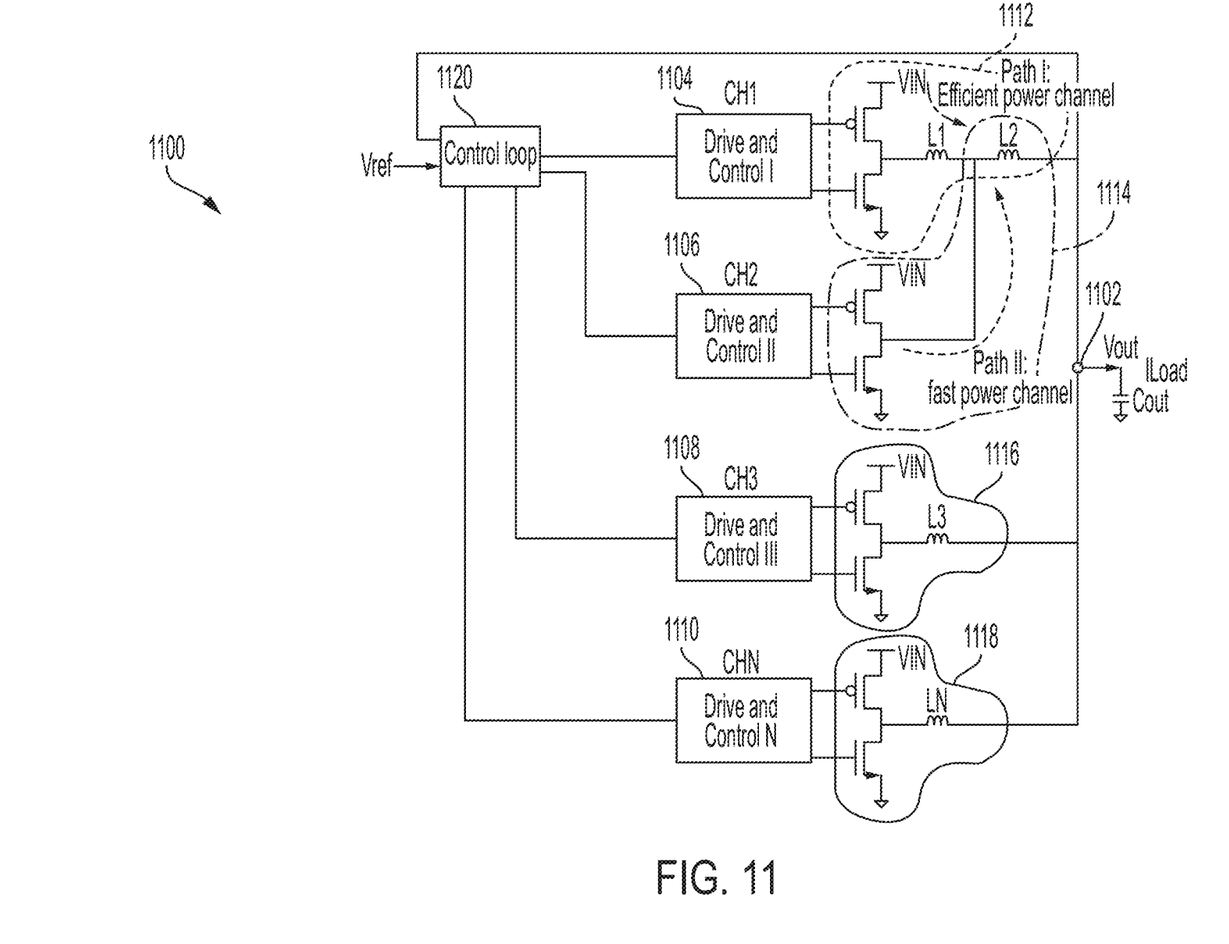
FIG. 11 is a schematic diagram illustrating a multi-phase converter, according to some embodiments.

FIG. 11 is a schematic diagram illustrating a multi-phase converter 1100, according to some embodiments. The converter 1100 may comprise a plurality of power channels 1112-1118, for providing an output voltage Vout and/or an output loading current ILoad to an output node 1102. The plurality of power channels may operate in different phases. Therefore, the converter 1100 may be referred to as a multi-phase converter. Although four power channels are illustrated in FIG. 11, it should be appreciated that a multi-phase converter 1100 may include any suitable number of power channels, such as three, five, or more.

The plurality of power channels 1112-1118 may each have an inductor that is coupled to the output node 1102, for example, inductors L2-L4. While the power channels 1114-1118 may each comprise a single inductor, the power channel 1112 may comprise two inductors L1 and L2 connected in series. The power channel 1112 may has a higher efficiency than the power channel 1114, which may have a shorter response time than the power channel 1112 when a transient event occurs at the output node 1102. In some embodiments, the power channel 1112 may has the highest efficiency compared to the power channels 1114-1118. In those cases, each of inductors L3 and L4 may has an inductance value that is less than a sum of inductance values of inductors L1 and L2.

The converter 1100 may comprise a plurality of drive and control circuits 1104-1110 to drive and control the plurality of power channels 1112-1118, respectively. A drive and control circuit may include a drive circuit to drive a corresponding power channel. A drive and control circuit may also include a control circuit that may be programmed with instructions to control a corresponding power channel to perform a method, for example, method 200, method 500, or method 800.

The converter 1100 may comprise a control loop circuit 1120. The control loop circuit 1120 may control the drive and control circuits 1104-1110 by, for example, comparing a feedback from the output node 1102 (e.g., the output voltage Vout) to a reference (e.g., a reference voltage Vref). The comparison results may indicate a magnitude of a load driven by the converter 1100 and/or a transient event at the output node 1102. In some embodiments, the control loop circuit may be a control circuit or a processor programmed with instructions for controlling the drive and control circuits 1104-1110.

Various aspects of the apparatus and techniques described herein may be used alone, in combination, or in a variety of arrangements not specially discussed in the embodiments described in the foregoing description and is therefore not limited in its application to the details and arrangement of components set forth in the foregoing description or illustrated in the drawings. For example, aspects described in one embodiment may be combined in any manner with aspects described in other embodiments.

The terms "approximately", "substantially," and "about" may be used to mean within ±20% of a target value in some embodiments, within ±10% of a target value in some embodiments, within ±5% of a target value in some embodiments, and yet within ±2% of a target value in some embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A converter for generating a loading current at an output node, the converter comprising:
   a plurality of inductors comprising a first inductor coupled to the output node; and
   a plurality of power channels comprising first and second power channels, wherein:
      the first power channel comprises the first inductor and a second inductor,
      the second power channel comprises the first inductor,
      the first power channel has higher power efficiency than the second power channel,
      the second inductor is directly coupled between switching nodes of the first and second power channels, and
      the first inductor is coupled between the switching node of the second power channel and the output node, wherein the first power channel is disabled and the second power channel is enabled for a first loading condition that is heavier than a second loading condition when the first power channel is enabled.

2. The converter of claim 1, wherein the second power channel has a faster transient response than the first power channel.

3. The converter of claim 1, wherein the second inductor is connected in series with the first inductor.

4. The converter of claim 1, wherein:
   the plurality of power channels comprise a third power channel,
   the plurality of inductors comprise a third inductor coupled to the output node, and
   the third power channel comprises the third inductor.

5. The converter of claim 4, wherein the first power channel has higher power efficiency than the third power channel.

6. The converter of claim 1, further comprising:
   a plurality of drive circuits to drive the plurality of power channels; and
   a control loop circuit to control the plurality of drive circuits.

7. The converter of claim 1, wherein the first and second power channels are driven with signals of 180 degree phase differences.

8. The converter of claim 1, wherein:
   the first power channel is enabled,
   the second power channel is enabled when a transient event occurs, and
   the second power channel is synchronized with the first power channel when the second power channel is enabled.

9. The converter of claim 1, wherein:
   the second power channel operates most of the time for the first loading condition.

10. The converter of claim 9, wherein:
    for the second loading condition, the second power channel is off, or enabled for a short time.

11. A converter for generating a loading current at an output node, the converter comprising:
    a first inductor coupled to the output node and having an inductance value;
    a first power channel comprising the first inductor and a second inductor connected in series with the first inductor, the second inductor having an inductance value; and
    a second power channel comprising the first inductor, wherein:
       the second inductor is directly coupled between switching nodes of the first and second power channels,
       the first inductor is coupled between the switching node of the second power channel and the output node, and
       the first power channel is disabled and the second power channel is enabled for a first loading condition that is heavier than a second loading condition when the first power channel is enabled.

12. The converter of claim 11, further comprising:
    a first drive circuit to drive the first power channel;
    a second drive circuit to drive the second power channel; and
    a control loop circuit to control the first and second drive circuits based on an output voltage at the output node and a reference voltage.

13. The converter of claim 12, wherein the control loop circuit is configured to determine at least one of a loading condition at the output node and an occurrence of a transient event at the output node.

14. The converter of claim 11, wherein a ratio of the inductance value of the second inductor to the inductance value of the first inductor is greater than 2 and less than 8.

15. The converter of claim 11, wherein the first and second power channels are driven with signals of 180 degree phase differences.

16. The converter of claim 11, wherein:
    the second power channel is enabled when a transient event occurs, and
    the second power channel is synchronized with the first power channel when the second power channel is enabled.

17. The converter of claim 11, wherein:
    the second power channel operates most of the time for the first loading condition.

18. The converter of claim 17, wherein:
    for the first loading condition, the second power channel is off, or enabled for a short time.

19. A method for a converter configured to generate a loading current at an output node of the converter, the converter comprising first and second power channels, the first power channel comprising first and second inductors, the second power channel comprising the first inductor, the second inductor being directly coupled between switching nodes of the first and second power channels, and the first inductor is coupled between the switching node of the second power channel and the output node, the method comprising:
    measuring a loading condition of the converter;
    determining whether the loading condition is larger than a threshold value; and
    operating the first power channel or the second power channel based on the determined loading condition, the first power channel having higher power efficiency than the second power channel, wherein the first power channel is disabled and the second power channel is enabled for a first loading condition that is heavier than a second loading condition when the first power channel is enabled.

* * * * *